US012254802B2

(12) United States Patent
Wang

(10) Patent No.: US 12,254,802 B2
(45) Date of Patent: Mar. 18, 2025

(54) LIGHT-EMITTING DEVICE DRIVING CIRCUIT

(71) Applicant: GaNrich Semiconductor Corporation, Hsinchu (TW)

(72) Inventor: Sheng-Bo Wang, Hsinchu (TW)

(73) Assignee: GaNrich Semiconductor Corporation, Hsinchu (TW)

( * ) Notice: Subject to any disclaimer, the term of this patent is extended or adjusted under 35 U.S.C. 154(b) by 44 days.

(21) Appl. No.: 18/228,772

(22) Filed: Aug. 1, 2023

(65) Prior Publication Data

US 2024/0046831 A1 Feb. 8, 2024

(51) Int. Cl.

| | |
|---|---|
| ***G09G 3/20*** | (2006.01) |
| *H05B 45/30* | (2020.01) |
| *H05B 45/34* | (2020.01) |
| *H05B 45/54* | (2020.01) |
| *H05B 45/59* | (2022.01) |

(52) U.S. Cl.

CPC ....... *G09G 3/20* (2013.01); *G09G 2320/0247* (2013.01); *G09G 2320/0626* (2013.01)

(58) Field of Classification Search

CPC ............ G09G 3/20; G09G 2320/0247; G09G 2320/0626; H05B 45/30; H05B 45/34; H05B 45/54; H05B 45/59

USPC .......................................................... 345/691

See application file for complete search history.

(56) References Cited

U.S. PATENT DOCUMENTS

2021/0126548 A1* 4/2021 Wang .................... H02M 7/217

* cited by examiner

*Primary Examiner* — Mark Edwards

(74) *Attorney, Agent, or Firm* — Patterson + Sheridan, LLP

(57) ABSTRACT

A light-emitting device driving circuit is provided. The light-emitting device driving circuit includes a current source, a light-emitting device series and an input-side voltage-stabilizing circuit. The input-side voltage-stabilizing circuit is electrically connected between the current source and the light-emitting device series to provide a driving current. The input-side voltage-stabilizing circuit includes a normally-on transistor, a first resistor and a compensation capacitor. The first resistor is electrically connected to the normally-on transistor. The compensation capacitor is electrically connected to the normally-on transistor and the light-emitting device series.

20 Claims, 13 Drawing Sheets

LIGHT-EMITTING DEVICE DRIVING CIRCUIT

CROSS REFERENCE TO RELATED APPLICATION

This application claims the benefit of Taiwan Application Serial No. 111129013, filed on Aug. 2, 2022, the subject matter of which is incorporated herein by reference.

BACKGROUND

Technical Field

The present disclosure relates in general to an electronic device, and in particular to a light-emitting device driving circuit with flickering free function.

Description of the Related Art

With the advantageous features of high brightness, long lifespan and low power consumption, light-emitting diode has been widely used in lighting and various electronic devices. However, the light-emitting diode may flicker in an alternating current (AC) source. When the current is forward, the light-emitting diode will be turned on; when the current is reverse, the light-emitting diode will be turned off. Since the positive/negative switching frequency of the AC source normally is 50 Hz or 60 Hz, the flickering frequency of the light-emitting diode is 50 or 60 times per second. Although the naked eyes can hardly perceive the flickering frequency of 50 or 60 Hz, such a flickering frequency still may cause side effects such as visual fatigue or headache. Therefore, it has become a prominent task for the research personnel in the industries to provide a flickering free circuit design.

SUMMARY

According to some embodiments of the present disclosure, a light-emitting device driving circuit is provided. With the circuit design of a normally-on transistor, resistors and a compensation capacitor of an input-side voltage-stabilizing circuit, the current can be stabilized and a flickering free effect can be achieved. Also, a voltage divider circuit design of the light-emitting device driving circuit can stabilize the power.

According to some embodiments of the present disclosure, a light-emitting device driving circuit is provided. The light-emitting device driving circuit includes a current source, a light-emitting device series and an input-side voltage-stabilizing circuit. The input-side voltage-stabilizing circuit is electrically connected between the current source and the light-emitting device series to provide a driving current. The input-side voltage-stabilizing circuit includes a normally-on transistor, a first resistor and a compensation capacitor. The first resistor is electrically connected to the normally-on transistor. The compensation capacitor is electrically connected to the normally-on transistor and the light-emitting device series.

The above and other aspects of the invention will become better understood with regard to the following detailed description of several but non-limiting embodiment(s). The following description is made with reference to the accompanying drawings.

DETAILED DESCRIPTION OF THE EMBODIMENTS

Figure 1A:
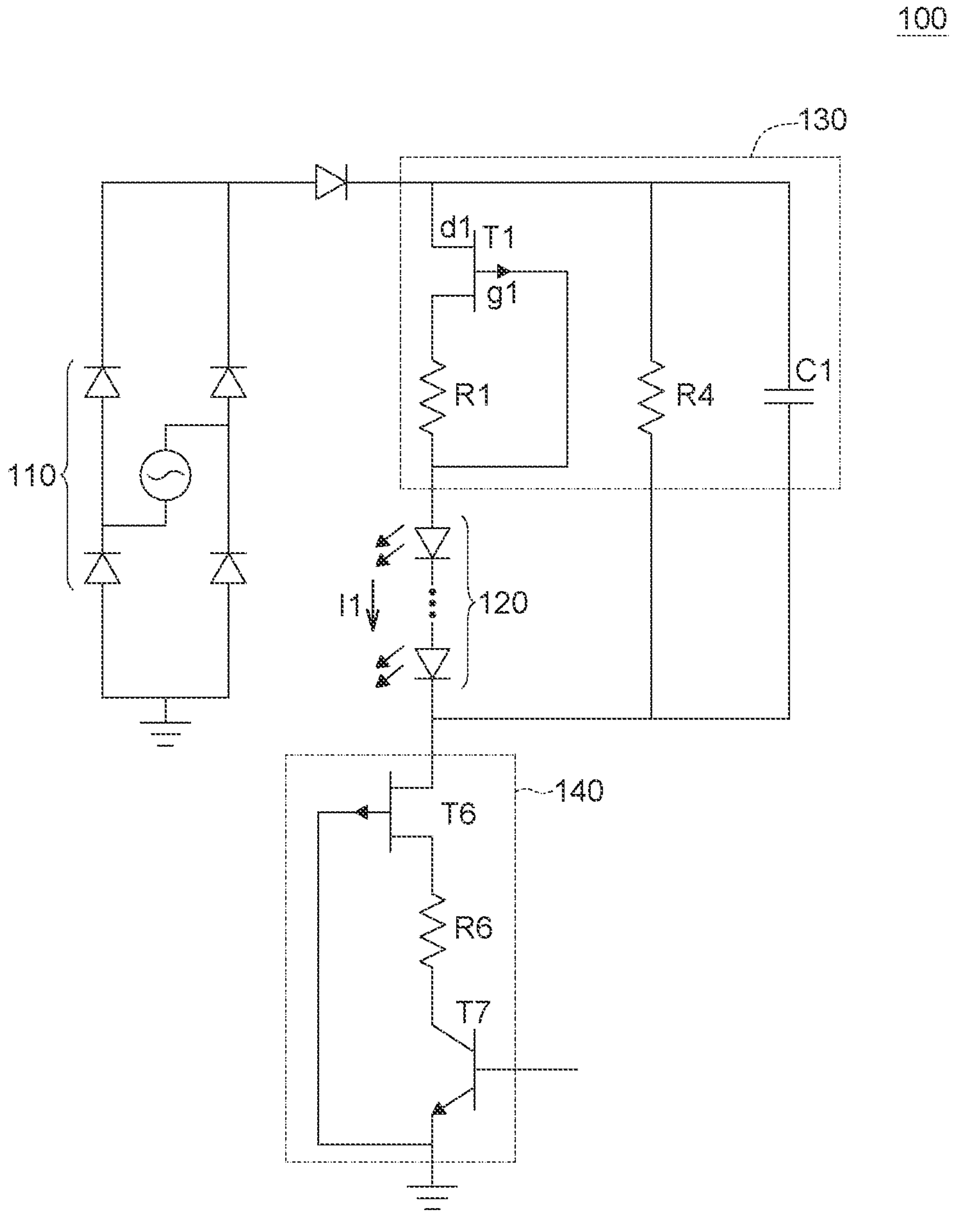
FIG. 1A is a schematic diagram of a light-emitting device driving circuit according to an embodiment of the present disclosure.

Referring to FIG. 1A, a schematic diagram of a light-emitting device driving circuit 100 according to an embodiment of the present disclosure is shown. The light-emitting device driving circuit 100 includes a current source 110, a light-emitting device series 120, such as a light-emitting diode series, and an input-side voltage-stabilizing circuit 130. The current source 110 is an AC power source. The light-emitting device series 120 is formed of several light-emitting devices (diodes) electrically connected in series. In some embodiments, the light-emitting device series 120 can be realized by a high-voltage light-emitting device formed of monolithic light-emitting units electrically connected in series. The input-side voltage-stabilizing circuit 130 is electrically connected between the current source 110 and the light-emitting device series 120 to stabilize a driving current 11. In the embodiment of FIG. 1A, the input-side voltage-stabilizing circuit 130 is provided with a current stabilizing function, which prevents the light-emitting device series 120 from frequency flickering. In an embodiment, the light-emitting device driving circuit 100 may include an output-side voltage-stabilizing circuit 140. The output-side voltage-stabilizing circuit 140 is electrically connected to the light-emitting device series 120 to increase the power factor (PF value) of the light-emitting device driving circuit 100 or adjust the brightness.

In an embodiment, the input-side voltage-stabilizing circuit 130 may include a normally-on transistor T1, a resistor R1 and a compensation capacitor C1. The normally-on transistor T1 includes a D-mode FET, such as a silicone based metal oxide semiconductor field effect transistor (Si-MOSFET) or a gallium nitride based high electron mobility transistor (GaN-HEMT). The normally-on transistor T1 is electrically connected to the current source 110. The resistor R1 is electrically connected to the normally-on transistor T1. The normally-on transistor T1, the resistor R1 and the light-emitting device series 120 are sequentially connected in series. A gate g1 of the normally-on transistor T1 is electrically connected to an input end of the light-emitting device series 120.

In an embodiment, the input-side voltage-stabilizing circuit 130 may include a resistor R4. The resistor R4 and the compensation capacitor C1 are electrically connected to the normally-on transistor T1 and the light-emitting device series 120. The resistor R4 and the compensation capacitor C1 are electrically connected in parallel with a drain d1 of the normally-on transistor T1 and an output end of the light-emitting device series 120.

Figure 1B:
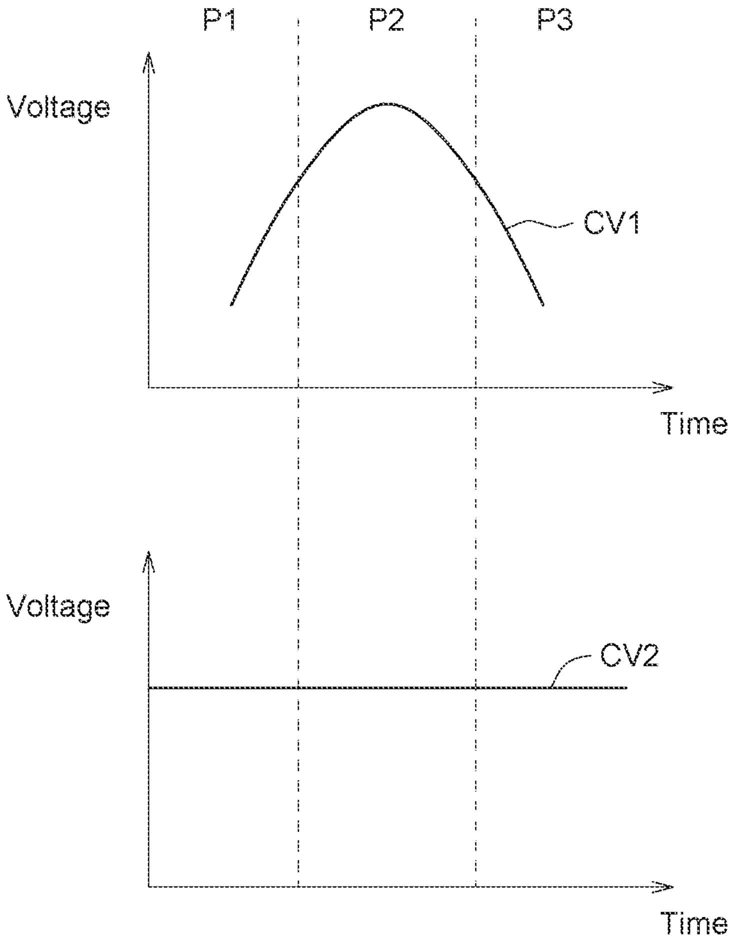
FIG. 1B is a schematic diagram of an input voltage curve and a driving current curve of the light-emitting device driving circuit of FIG. 1A.

The light-emitting device series 120 has a fixed driving current 11. Referring to FIG. 1B, a schematic diagram of a voltage curve CV1 of an input voltage providing by the current source 110 and a current curve CV2 of the driving current 11 of the light-emitting device series 120 of FIG. 1A is shown. The current source 110 provides an input current corresponding to the input voltage. The normally-on transistor T1 can inhibit the input current under the high-level part P2 of the current source 110 from a higher current to the driving current 11. The compensation capacitor C1 can compensate the input current under the low-level parts P1 and P3 of the current source 110 from a lower current to the driving current 11. Thus, the driving current 11 inputted to the light-emitting device series 120 can maintain at the same level.

The output-side voltage-stabilizing circuit 140 is electrically connected to an output end of the light-emitting device series 120. The output-side voltage-stabilizing circuit 140 includes a normally-on transistor T6, a resistor R6 and an NPN transistor T7. The NPN transistor T7 is configured to adjust the brightness of the light-emitting device series 120. The normally-on transistor T6 can also inhibit the high-level part P2 of the current source 110.

In other embodiments, the output-side voltage-stabilizing circuit 140 may not include the NPN transistor T7, which is normally-off.

Figure 2:
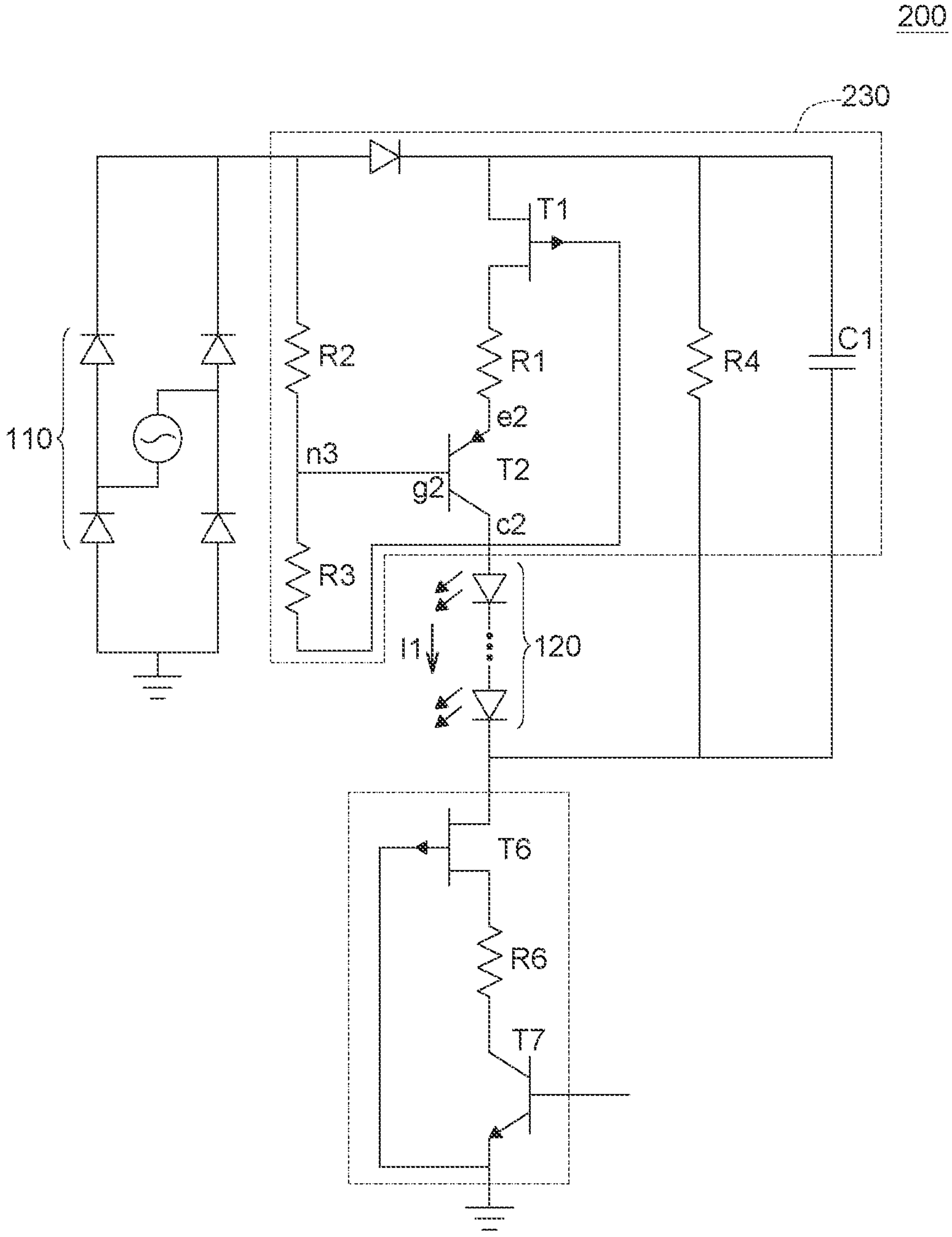
FIG. 2 is a schematic diagram of a light-emitting device driving circuit according to another embodiment of the present disclosure.

Referring to FIG. 2, a schematic diagram of a light-emitting device driving circuit 200 according to another embodiment of the present disclosure is shown. The light-emitting device driving circuit 200 of FIG. 2 is similar to the light-emitting device driving circuit 100, and the similarities are not repeated here. An input-side voltage-stabilizing circuit 230 of the light-emitting device driving circuit 200 further includes a resistor R2, a resistor R3 and a PNP transistor T2. The resistor R2 is electrically connected to the current source 110. The resistor R3 is electrically connected to the resistor R2. An emitter e2 of the PNP transistor T2 is electrically connected to the resistor R1, a collector c2 of the PNP transistor T2 is electrically connected to the light-emitting device series 120, and a gate g2 of the PNP transistor T2 is electrically connected to a node n3 between the resistor R2 and the resistor R3. The resistor R3 is electrically connected to the collector c2 of the PNP transistor T2.

In the present embodiment, the voltage divider circuit including the resistor R2, the resistor R3 and the PNP transistor T2 can stabilize the power. When the voltage of the current source 110 is large, the node n3 has a higher voltage, and the PNP transistor T2 produces a larger resistance, so that the driving current 11 is decreased to maintain the power at certain Watt-range. Thus, in addition to the current stabilizing function, the input-side voltage-stabilizing circuit 230 can further provide a power stabilizing function.

Figure 3:
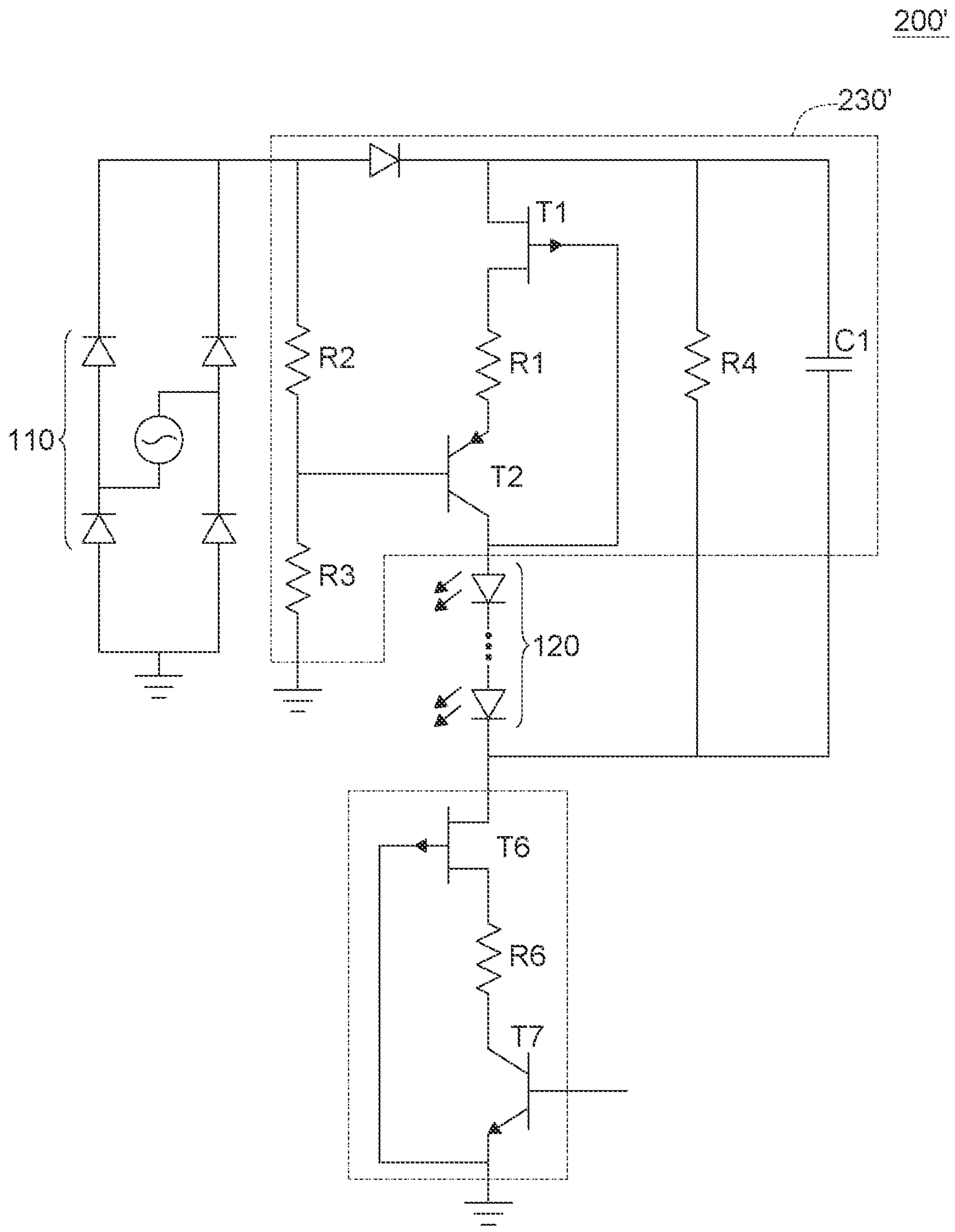
FIG. 3 is a schematic diagram of a light-emitting device driving circuit according to another embodiment of the present disclosure.

Referring to FIG. 3, a schematic diagram of a light-emitting device driving circuit 200' according to another embodiment of the present disclosure is shown. A difference between the light-emitting device driving circuit 200' and the light-emitting device driving circuit 200 of FIG. 2 is that the resistor R3 of the input-side voltage-stabilizing circuit 230' is grounded. The input-side voltage-stabilizing circuit 230' can implement the power stabilizing function whether the resistor R3 is grounded or electrically connected to a reference voltage.

Figure 4:
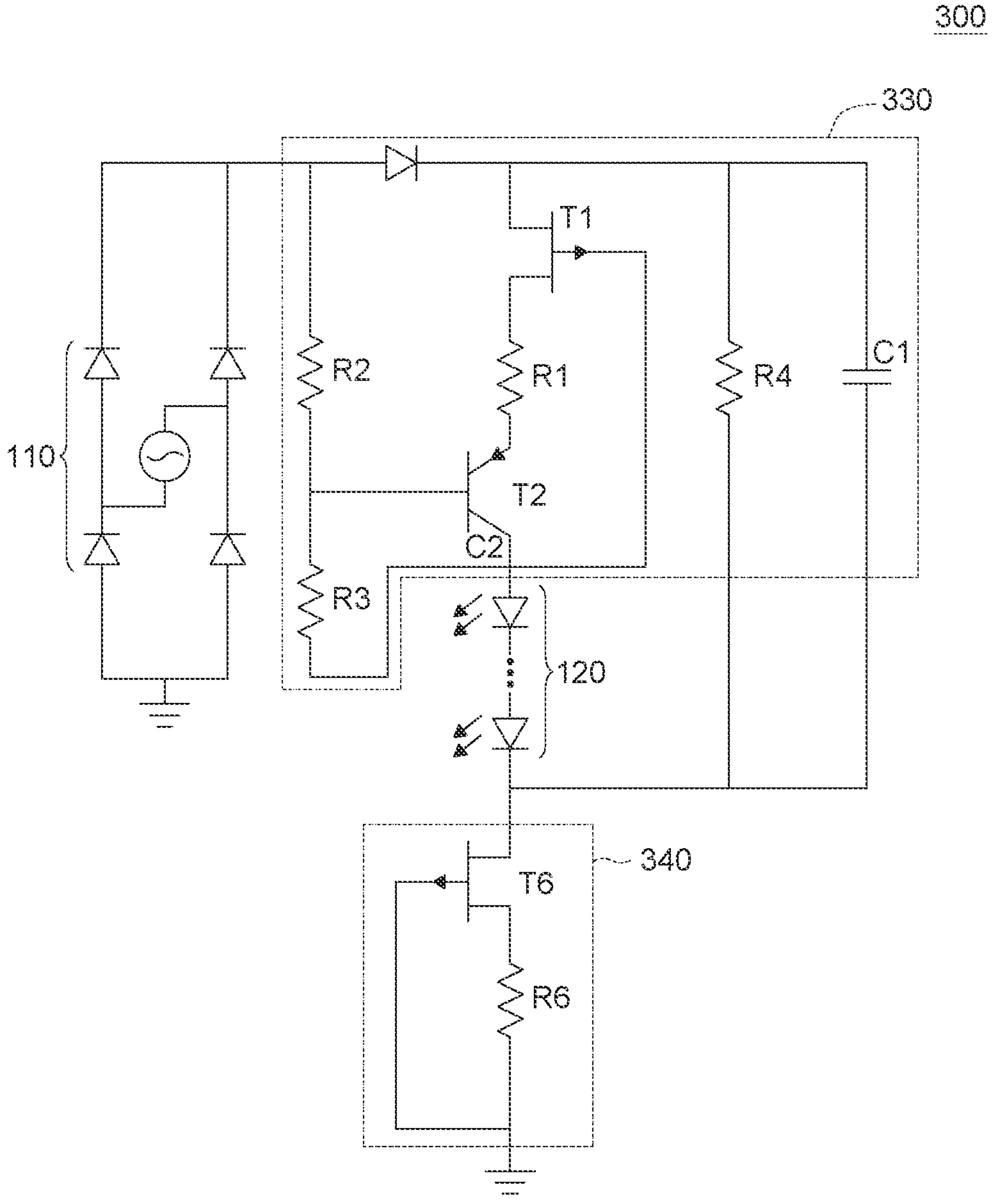
FIG. 4 is a schematic diagram of a light-emitting device driving circuit according to another embodiment of the present disclosure.

Referring to FIG. 4, a schematic diagram of a light-emitting device driving circuit 300 according to another embodiment of the present disclosure is shown. The difference between the light-emitting device driving circuit 300 and the light-emitting device driving circuit 200 of FIG. 2 is that the output-side voltage-stabilizing circuit 340 does not include an NPN transistor T7. Although the light-emitting device driving circuit 300 is not provided with an NPN transistor T7, the input-side voltage-stabilizing circuit 330 still can implement the current stabilizing and power stabilizing functions.

Figure 5:
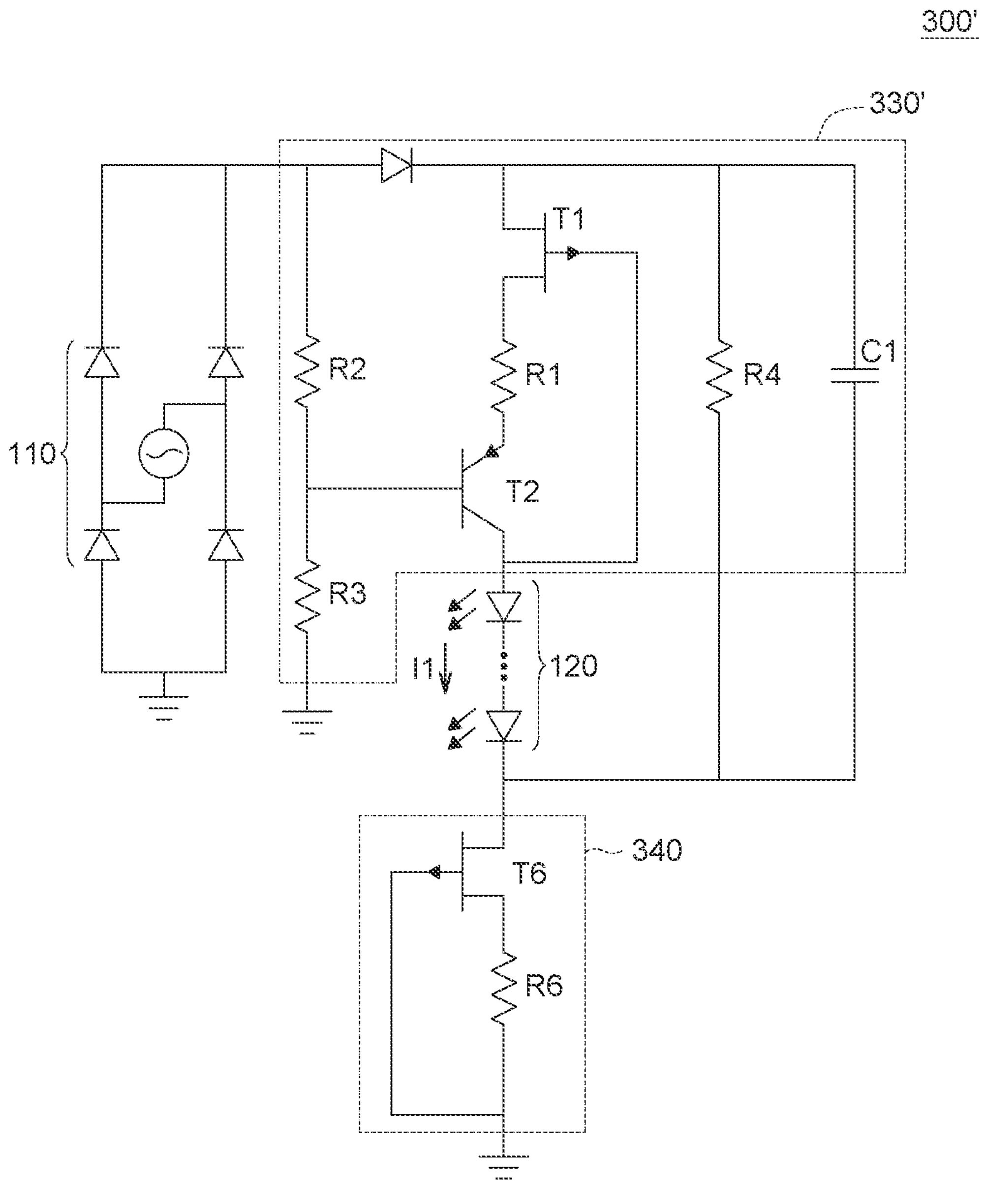
FIG. 5 is a schematic diagram of a light-emitting device driving circuit according to another embodiment of the present disclosure.

Referring to FIG. 5, a schematic diagram of a light-emitting device driving circuit 300' according to another embodiment of the present disclosure is shown. The difference between the light-emitting device driving circuit 300' and the light-emitting device driving circuit 200' of FIG. 3 is that the output-side voltage-stabilizing circuit 340 is not provided with an NPN transistor T7. Although the light-emitting device driving circuit 300' is not provided with the NPN transistor T7, the input-side voltage-stabilizing circuit 330' still can implement the current stabilizing and power stabilizing functions.

Figure 6:
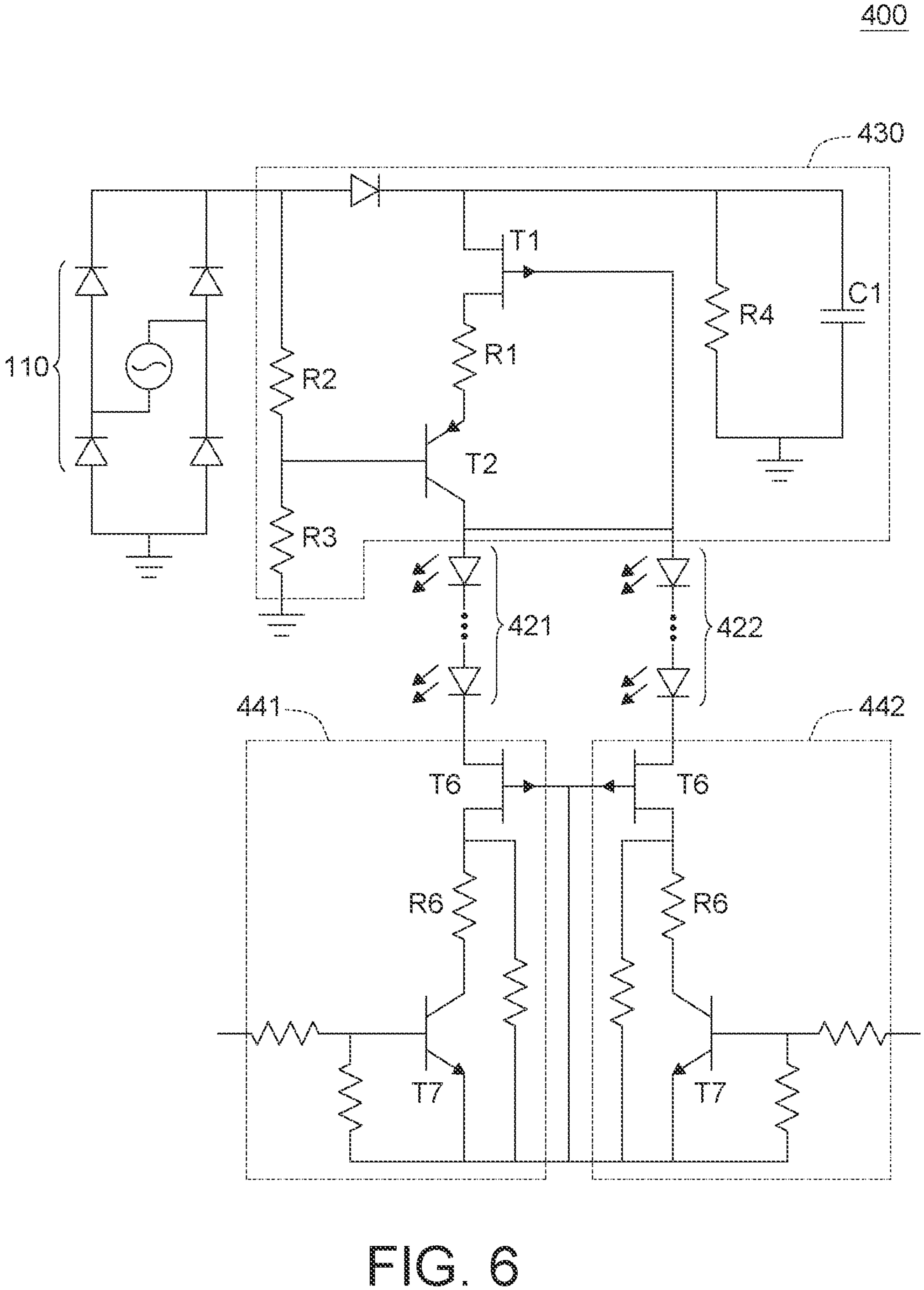
FIG. 6 is a schematic diagram of a light-emitting device driving circuit according to another embodiment of the present disclosure.

Referring to FIG. 6, a schematic diagram of a light-emitting device driving circuit 400 according to another embodiment of the present disclosure is shown. The difference between the light-emitting device driving circuit 400 and the light-emitting device driving circuit 200' of FIG. 3 is that the light-emitting device driving circuit 400 includes two light-emitting device series 421 and 422 and two output-side voltage-stabilizing circuits 441 and 442 electrically connected to the light-emitting device series 421 and 422, respectively. Moreover, the resistor R4 and one end of the compensation capacitor C1 are grounded. The light-emitting device series 421 and 422 are electrically connected in parallel. In an embodiment, the light-emitting device series 421 and 422 can emit different colors of light, such as white light and yellow light. The light-emitting device series 421 and the light-emitting device series 422 can be turned on concurrently or separately. With the light-emitting device series 421 and the light-emitting device series 422 being turned on concurrently or separately, the color of a mixing light from the lights of the light-emitting device series 421 and the light-emitting device series 422 can be adjusted. In one embodiment, the light-emitting device series 421 and 422 emit a white light and a yellow light respectively. When the light-emitting device series 421 is turned on and the light-emitting device series 422 is turned off, the mixing light is emitted from the light-emitting device series 421 which is a white light. When the light-emitting device series 422 is turned on and the light-emitting device series 421 is turned off, the mixing light is emitted from the light-emitting device series 422 which is a yellow light. When the light-emitting device series 421 and the light-emitting device series 422 are concurrently turned on, the mixing light is a mixture of white light and yellow light emitted by the light-emitting device series 421 and the light-emitting device series 422, and which is a warm white light. That is, the color temperature of the white light can be adjusted. The light-emitting device series 421 and 422 share the same input-side voltage-stabilizing circuit 430.

The output-side voltage-stabilizing circuit 441 is electrically connected to an output end of the light-emitting device series 421; the output-side voltage-stabilizing circuit 442 is electrically connected to an output end of the light-emitting device series 422. Similar to the output-side voltage-stabilizing circuit 140 of FIG. 1A, the output-side voltage-stabilizing circuit 441 includes an NPN transistor T7 configured to adjust the brightness of the light-emitting device series 421. Similar to the output-side voltage-stabilizing circuit 140 of FIG. 1A, the output-side voltage-stabilizing circuit 442 includes an NPN transistor T7 configured to adjust the brightness of the light-emitting device series 422.

In the light-emitting device driving circuit 400, the number of the light-emitting device series is not limited to two, and it can be more than two. The number of the output-side voltage-stabilizing circuit 441 is corresponded to the number of the light-emitting device series. In additional to the embodiment of FIG. 6, the number of light-emitting device series of each of the embodiments mentioned above can be more than 2, and the number of output-side voltage-stabilizing circuit can also be more than 2.

Figure 7:
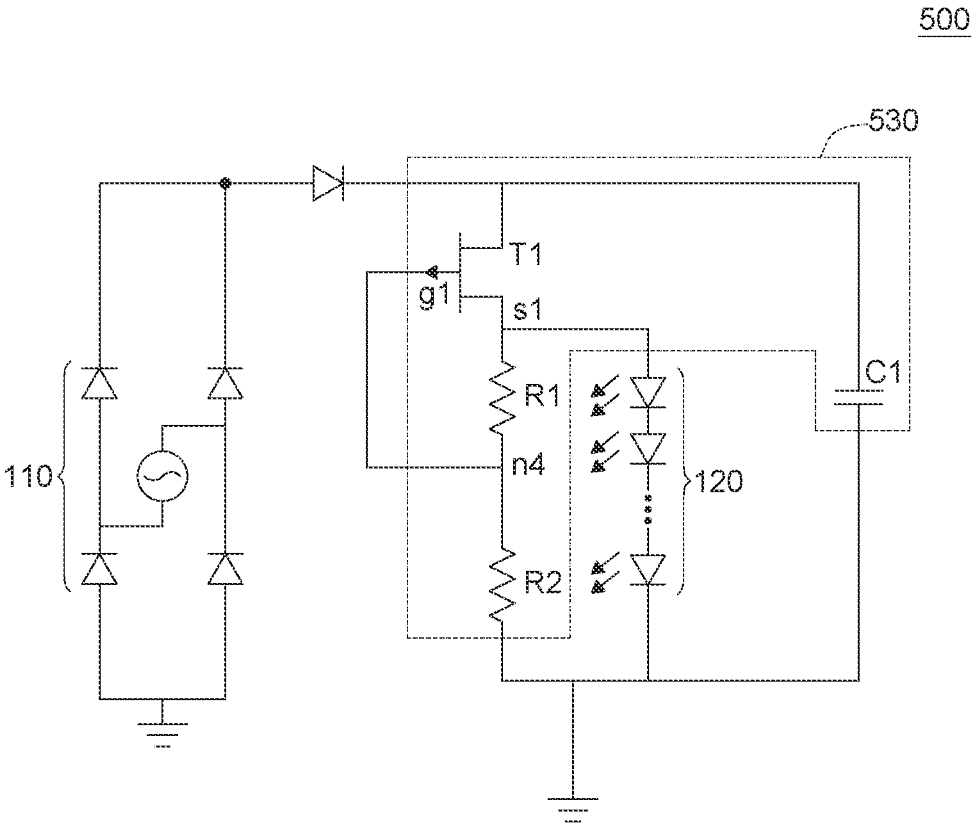
FIG. 7 is a schematic diagram of a light-emitting device driving circuit according to another embodiment of the present disclosure.

Referring to FIG. 7, a schematic diagram of a light-emitting device driving circuit 500 according to another embodiment of the present disclosure is shown. The difference between the light-emitting device driving circuit 500 and the light-emitting device driving circuit 100 of FIG. 1A is that the input-side voltage-stabilizing circuit 530 of the light-emitting device driving circuit 500 further includes a resistor R2, and the light-emitting device driving circuit 500 does not include the output-side voltage-stabilizing circuit 140. The resistor R2 is electrically connected between the resistor R1 and the output end of the light-emitting device series 120. The gate g1 of the normally-on transistor T1 is electrically connected to a node n4 between the resistor R1 and the resistor R2. The input end of the light-emitting device series 120 is electrically connected to a source s1 of the normally-on transistor T1. The output end of the light-emitting device series 120 is grounded.

The normally-on transistor T1 can inhibit the input current under the high-level part P2 (illustrated in FIG. 1B) of the current source 110 from a higher current to the driving current 11. The compensation capacitor C1 can compensate the input current under the low-level parts P1 and P3 (illustrated in FIG. 1B) of the current source 110 from a lower current to the driving current 11. The normally-on transistor T1 and the compensation capacitor C1 can stabilize the current. The voltage divider circuit formed of the resistor R1 and the resistor R2 can stabilize the power. Thus, the input-side voltage-stabilizing circuit 530 is provided with both the current stabilizing function and the power stabilizing function.

Referring to Table 1, changes in the power of the light-emitting device driving circuit 500 when the current source 110 is at different voltages are illustrated. As illustrated in Table 1, when the current source 110 is at different voltages, the power of the light-emitting device driving circuit 500 may be maintained between 5.28 W and 5.34 W, to achieve the power stabilizing result.

TABLE 1

| Current source 110 (alternating current) | Power (W) | Input current (mA) | Power factor | Total harmonic current distortion |
|---|---|---|---|---|
| 220 V-50 Hz | 5.34 | 45.5 | 0.532 | 148.12 |
| 230 V-50 Hz | 5.31 | 44.2 | 0.521 | 153.3 |
| 240 V-50 Hz | 5.34 | 43.42 | 0.51 | 158.4 |
| 250 V-50 Hz | 5.31 | 42.2 | 0.5 | 163.2 |
| 260 V-50 Hz | 5.28 | 41 | 0.491 | 168 |

Figure 8:
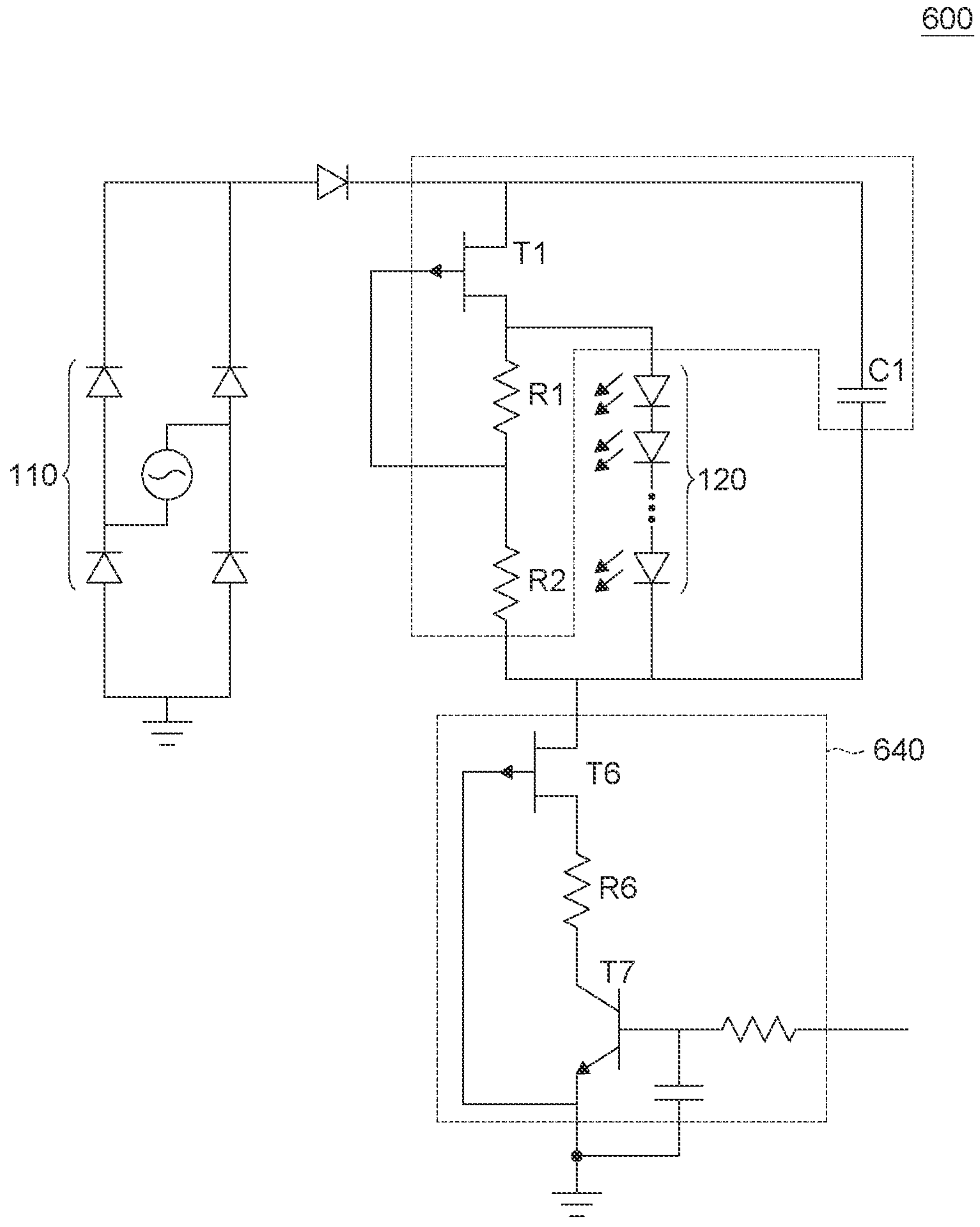
FIG. 8 is a schematic diagram of a light-emitting device driving circuit according to another embodiment of the present disclosure.

Referring to FIG. 8, a schematic diagram of a light-emitting device driving circuit 600 according to another embodiment of the present disclosure is shown. The difference between the light-emitting device driving circuit 600 and the light-emitting device driving circuit 500 of FIG. 7 is that the light-emitting device driving circuit 600 further includes an output-side voltage-stabilizing circuit 640. The output-side voltage-stabilizing circuit 640 is configured to increase the power factor (PF value) and adjust the brightness. The NPN transistor T7 is configured to adjust the brightness of the light-emitting device series 120. In the output-side voltage-stabilizing circuit 640, the normally-on transistor T6 can also inhibit the high-level part P2 (illustrated in FIG. 1B) of the current source 110.

In other embodiments, the output-side voltage-stabilizing circuit 640 does not include the normally-off transistor T7.

Referring to Table 2, changes in the power of the light-emitting device driving circuit 600 when the current source 110 is at different voltages are illustrated. As illustrated in Table 2, when the current source 110 is at different voltages, the power of the light-emitting device driving circuit 600 can be maintained between 6.25 and 6.6 w to achieve the power stabilizing result.

TABLE 2

| Current source 110 (alternating current) | Power (w) | Input current (mA) | Power factor | Total harmonic current distortion |
|---|---|---|---|---|
| 220 V-50 Hz | 6.25 | 40.9 | 0.7 | 93.5 |
| 230 V-50 Hz | 6.6 | 40.8 | 0.7 | 93.5 |
| 240 V-50 Hz | 6.44 | 39.6 | 0.67 | 100.5 |
| 250 V-50 Hz | 6.34 | 38.5 | 0.65 | 105.2 |
| 260 V-50 Hz | 6.31 | 37.6 | 0.63 | 109 |

Figure 9A:
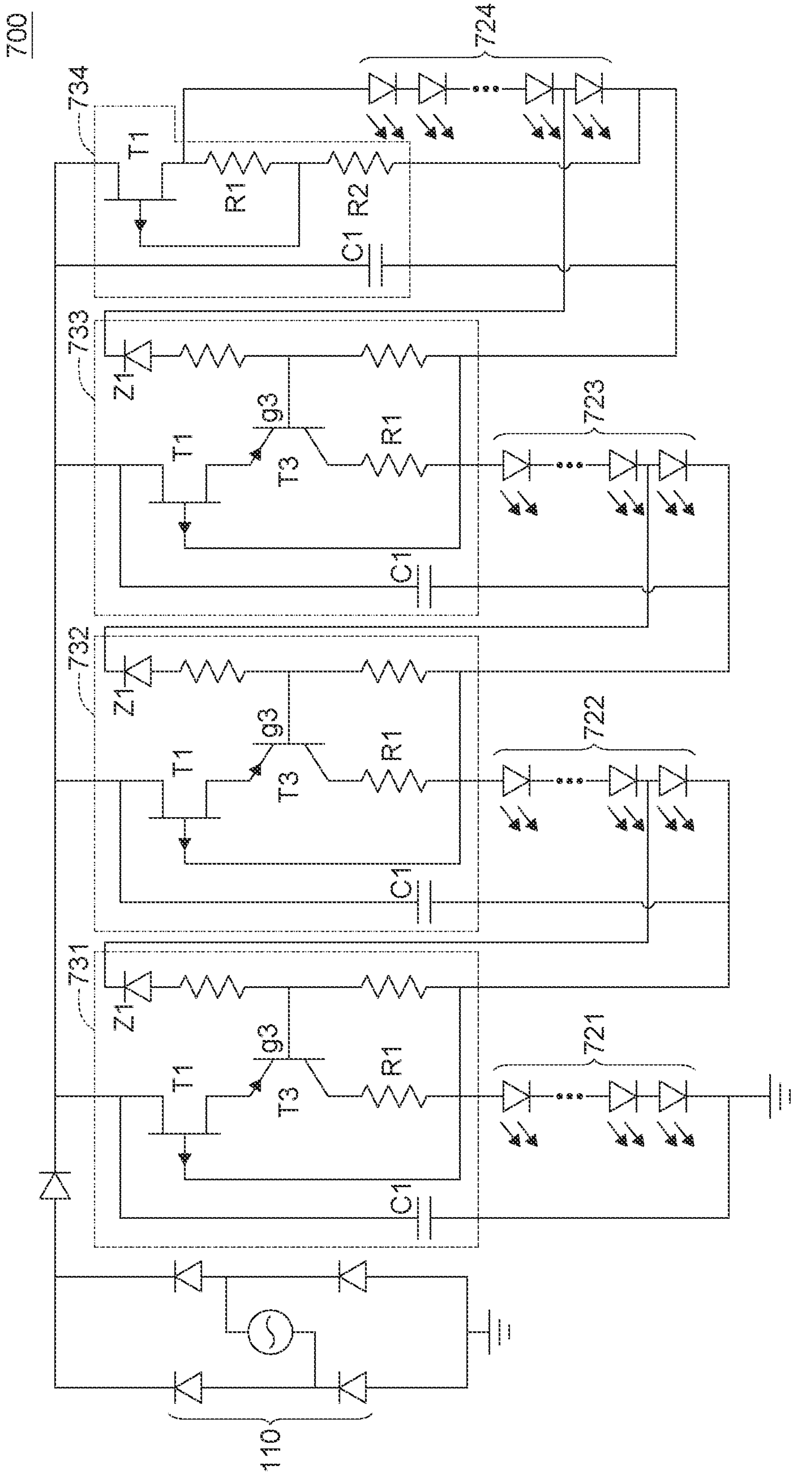
FIG. 9A is a schematic diagram of a light-emitting device driving circuit according to another embodiment of the present disclosure.

Referring to FIG. 9A, a schematic diagram of a light-emitting device driving circuit 700 according to another embodiment of the present disclosure is shown. The difference between the light-emitting device driving circuit 700 and the light-emitting device driving circuit 500 of FIG. 7 is that the light-emitting device driving circuit 700 is provided with a multi-stage lighting design. The light-emitting device driving circuit 700 includes several input-side voltage-stabilizing circuits, and several light-emitting device series corresponding to the several input-side voltage-stabilizing circuits. The input-side voltage-stabilizing circuits are electrically connected between the current source 110 and the light-emitting device series. In one embodiment, the light-emitting device driving circuit 700 includes a four-stage lighting design. The light-emitting device driving circuit 700 includes four input-side voltage-stabilizing circuits 731, 732, 733, and 734 and four light-emitting device series 721, 722, 723, and 724. The input-side voltage-stabilizing circuit 731 is electrically connected between the current source 110 and the light-emitting device series 721, the input-side voltage-stabilizing circuit 732 is electrically connected between the current source 110 and the light-emitting device series 722, the input-side voltage-stabilizing circuit 733 is electrically connected between the current source 110 and the light-emitting device series 723, and the input-side voltage-stabilizing circuit 734 is electrically connected between the current source 110 and the light-emitting device series 724.

The output end of the light-emitting device series 721 is grounded. The input end of the light-emitting device series 721 is electrically connected to the output end of the light-emitting device series 722; the input end of the light-emitting device series 722 is electrically connected to the output end of the light-emitting device series 723; the input end of the light-emitting device series 723 is electrically connected to the output end of the light-emitting device series 724.

Each of the input-side voltage-stabilizing circuits 731, 732, and 733 includes a PNP transistor T3 and a Zener diode Z1. The PNP transistor T3 is arranged between the normally-on transistor T1 and the resistor R1. The Zener diode Z1 is electrically connected to a gate g3 of the PNP transistor T3.

The turn-on voltage of the Zener diode Z1 is such as 6V. The turn-on voltage of a light-emitting device series is such as 9V.

When merely the light-emitting device series 721 is turned on, the current stabilizing function is performed by the input-side voltage-stabilizing circuit 731.

When the light-emitting device series 722 is turned on, the Zener diode Z1 of the input-side voltage-stabilizing circuit 731 will be turned on, so that the normally-on transistor T1 of the input-side voltage-stabilizing circuit 731 is turned off. Meanwhile, the current stabilizing function changes to be performed by the input-side voltage-stabilizing circuit 732.

When the light-emitting device series 723 is turned on, the Zener diode Z1 of the input-side voltage-stabilizing circuit 732 will be turned on, so that the normally-on transistor T1 of the input-side voltage-stabilizing circuit 732 is turned off. Meanwhile, the current stabilizing function changes to be performed by the input-side voltage-stabilizing circuit 733.

When the light-emitting device series 724 is turned on, the Zener diode Z1 of the input-side voltage-stabilizing circuit 733 will be turned on, so that the normally-on transistor T1 of the input-side voltage-stabilizing circuit 733 is turned off. Meanwhile, the current stabilizing function changes to be performed by the input-side voltage-stabilizing circuit 734.

Figure 9B:
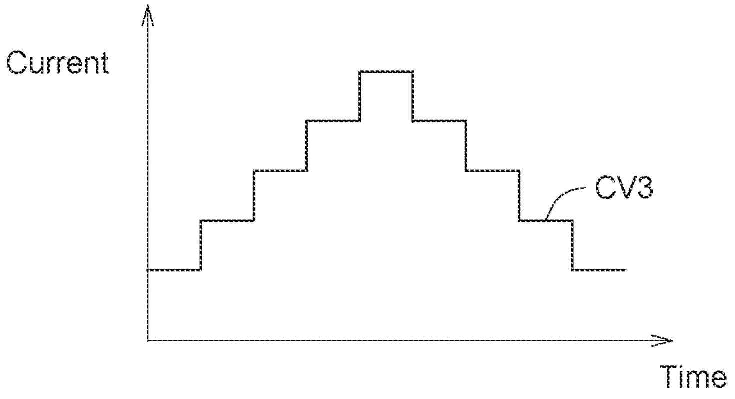
FIG. 9B is a schematic diagram of a current curve of the light-emitting device driving circuit of FIG. 9A.

Referring to FIG. 9B, a schematic diagram of a current curve CV3 of the light-emitting device driving circuit 700 of FIG. 9A is shown. As the voltage of the current source 110 increases, the current stabilizing function gradually switches from the input-side voltage-stabilizing circuit 731 to the input-side voltage-stabilizing circuit 734. Thus, the current curve CV3 presents a stepped shape of stable current.

Besides, the input-side voltage-stabilizing circuit 734 also performs the power stabilizing function with the voltage divider circuit formed of the resistor R1 and the resistor R2. Thus, the light-emitting device driving circuit 700 is provided with both the current stabilizing function and the power stabilizing function.

Figure 10:
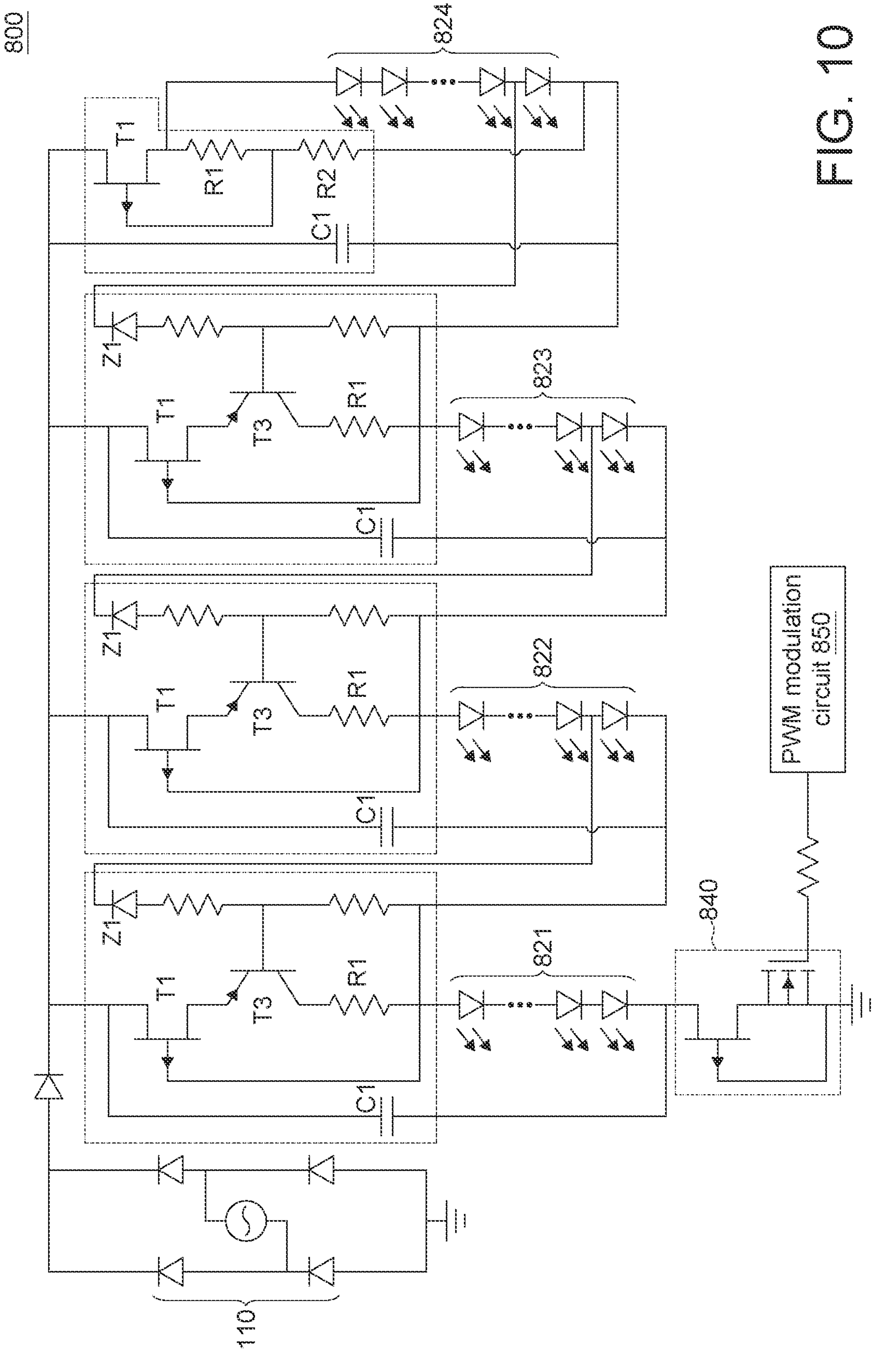
FIG. 10 is a schematic diagram of a light-emitting device driving circuit according to another embodiment of the present disclosure.

Referring to FIG. 10, a schematic diagram of a light-emitting device driving circuit 800 according to another embodiment of the present disclosure is shown. The difference between the light-emitting device driving circuit 800 and the light-emitting device driving circuit 700 of FIG. 9A is that the light-emitting device driving circuit 800 further includes an output-side voltage-stabilizing circuit 840 and a pulse width modulation (PWM) modulation circuit 850. The output-side voltage-stabilizing circuit 840 is electrically connected to the output end of the light-emitting device series 821. The PWM modulation circuit 850 is electrically connected to the output-side voltage-stabilizing circuit 840 to adjust the brightness of the light-emitting device series 821, 822, 823, 824.

Figure 11:
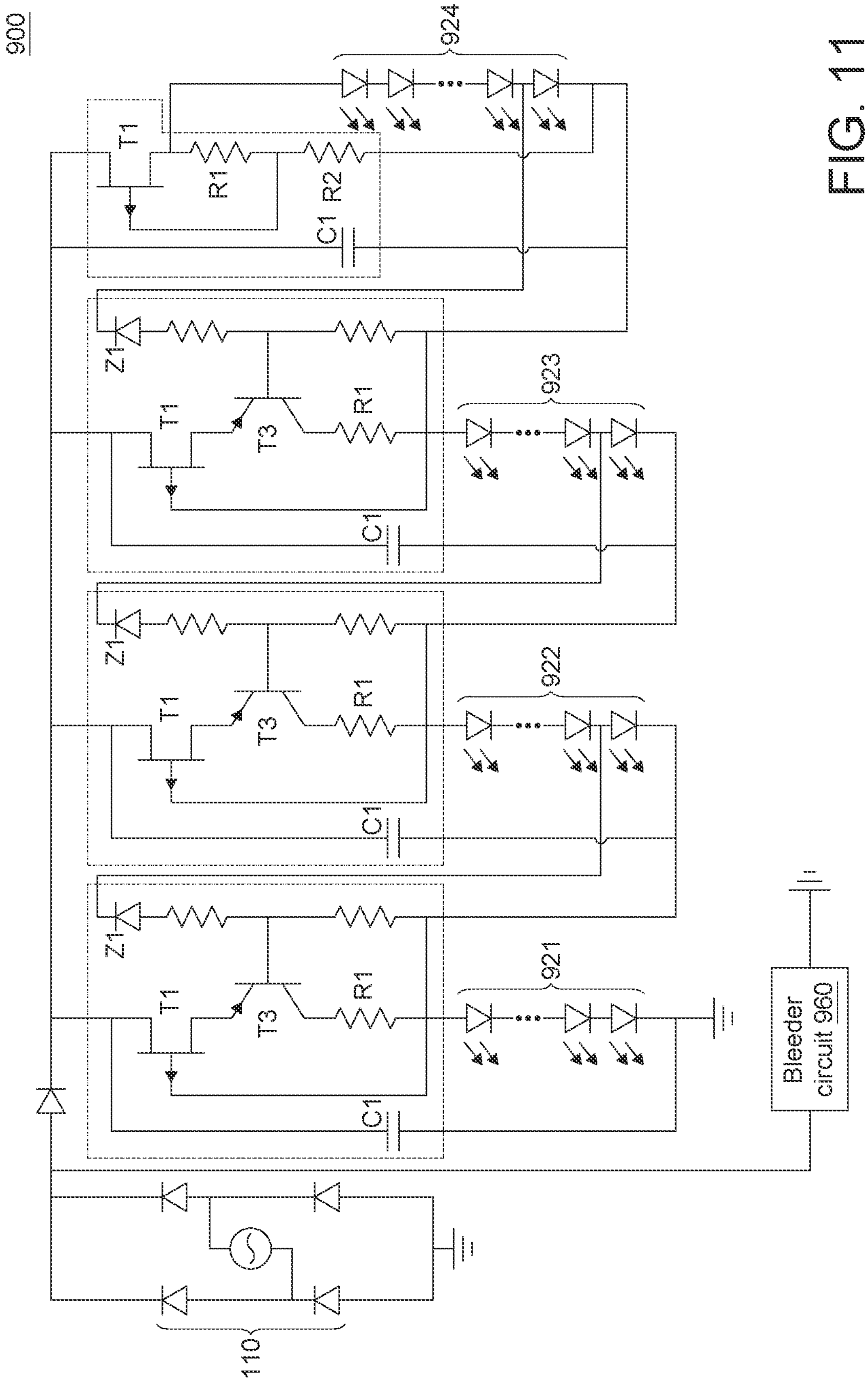
FIG. 11 is a schematic diagram of a light-emitting device driving circuit according to another embodiment of the present disclosure.

Referring to FIG. 11, a schematic diagram of a light-emitting device driving circuit 900 according to another embodiment of the present disclosure is shown. The difference between the light-emitting device driving circuit 900 of FIG. 11 and the light-emitting device driving circuit 700 of FIG. 9A is that the light-emitting device driving circuit 900 further includes a bleeder circuit 960. The bleeder circuit 960 is electrically connected to the current source 110 to adjust the brightness of the light-emitting device series 921, 922, 923, 924.

According to the above embodiments, the light-emitting device driving circuit provides a current stabilizing function through the circuit design of the normally-on transistor, the resistor and the compensation capacitor of an input-side voltage-stabilizing circuit to achieve the flickering free result. Besides, the light-emitting device driving circuit can also provide a power stabilizing function through the circuit design of a voltage divider circuit.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light-emitting device driving circuit, comprising:
- a current source providing an input current;
- a light-emitting device series; and
- an input-side voltage-stabilizing circuit, electrically connected between the current source and the light-emitting device series to provide a driving current, wherein the input-side voltage-stabilizing circuit comprises:
  - a normally-on transistor;
  - a first resistor, electrically connected to the normally-on transistor; and
  - a compensation capacitor, electrically connected to the normally-on transistor and the light-emitting device series.

2. The light-emitting device driving circuit according to claim 1, wherein the normally-on transistor, the first resistor and the light-emitting device series are connected in series, and a gate of the normally-on transistor is electrically connected to an input end of the light-emitting device series.

3. The light-emitting device driving circuit according to claim 2, wherein the compensation capacitor is electrically connected in parallel with a drain of the normally-on transistor and an output end of the light-emitting device series.

4. The light-emitting device driving circuit according to claim 2, further comprising:
- an output-side voltage-stabilizing circuit, electrically connected to an output end of the light-emitting device series.

5. The light-emitting device driving circuit according to claim 4, wherein the output-side voltage-stabilizing circuit comprises:

an NPN transistor, configured to adjust a brightness of the light-emitting device series.

6. The light-emitting device driving circuit according to claim 2, wherein the input-side voltage-stabilizing circuit further comprises:

a second resistor, electrically connected to the current source;

a third resistor, electrically connected to the second resistor; and a PNP transistor, wherein an emitter of the PNP transistor is electrically connected to the first resistor, a collector of the PNP transistor is electrically connected to the light-emitting device series, and a gate of the PNP transistor is electrically connected to a node between the second resistor and the third resistor.

7. The light-emitting device driving circuit according to claim 6, wherein the third resistor is electrically connected to the collector of the PNP transistor.

8. The light-emitting device driving circuit according to claim 6, wherein the third resistor is grounded.

9. The light-emitting device driving circuit according to claim 2, further comprising another light-emitting device series, wherein these light-emitting device series are electrically connected in parallel.

10. The light-emitting device driving circuit according to claim 9, further comprising:

two output-side voltage-stabilizing circuits, wherein each of the output-side voltage-stabilizing circuits is electrically connected to an output end of one of the light-emitting device series.

11. The light-emitting device driving circuit according to claim 10, wherein each of the output-side voltage-stabilizing circuits comprises an NPN transistor configured to adjust a brightness of one of the light-emitting device series.

12. The light-emitting device driving circuit according to claim 1, wherein the input-side voltage-stabilizing circuit further comprises:

a second resistor, electrically connected between the first resistor and an output end of the light-emitting device series, wherein a gate of the normally-on transistor is electrically connected to a node between the first resistor and the second resistor, and an input end of the light-emitting device series is electrically connected to a source of the normally-on transistor.

13. The light-emitting device driving circuit according to claim 12, wherein an output end of the light-emitting device series is grounded.

14. The light-emitting device driving circuit according to claim 12, further comprising:

an output-side voltage-stabilizing circuit, electrically connected to an output end of the light-emitting device series.

15. The light-emitting device driving circuit according to claim 14, wherein the output-side voltage-stabilizing circuit comprises an NPN transistor configured to adjust a brightness of the light-emitting device series.

16. The light-emitting device driving circuit according to claim 1, further comprising another one or more input-side voltage-stabilizing circuits, and another one or more light-emitting device series, wherein each of the input-side voltage-stabilizing circuits is electrically connected between the current source and one of the light-emitting device series.

17. The light-emitting device driving circuit according to claim 16, wherein an input end of one of the light-emitting device series is electrically connected to an output end of another one of the light-emitting device series.

18. The light-emitting device driving circuit according to claim 16, wherein some of the input-side voltage-stabilizing circuits further comprise:

a PNP transistor, arranged between the normally-on transistor and the first resistor; and a Zener diode, electrically connected to a gate of the PNP transistor.

19. The light-emitting device driving circuit according to claim 16, wherein an output end of one of the light-emitting device series is grounded.

20. The light-emitting device driving circuit according to claim 16, further comprising:

an output-side voltage-stabilizing circuit, electrically connected to an output end of one of the light-emitting device series; and a PWM modulation circuit, electrically connected to the output-side voltage-stabilizing circuit to adjust a brightness of the light-emitting device series.

* * * * *